United States Patent [19]
Sawachika et al.

[11] Patent Number: 5,485,172
[45] Date of Patent: Jan. 16, 1996

[54] AUTOMATIC IMAGE REGULATING ARRANGEMENT FOR HEAD-MOUNTED IMAGE DISPLAY APPARATUS

[75] Inventors: Isao Sawachika, Kanagawa; Yoshiro Muraoka, Tokyo; Masami Torizuka, Kanagawa, all of Japan

[73] Assignee: Sony Corporation, Tokyo, Japan

[21] Appl. No.: 243,705

[22] Filed: May 17, 1994

[30] Foreign Application Priority Data

May 21, 1993 [JP] Japan .................................. 5-119401
Jun. 1, 1993 [JP] Japan .................................. 5-129888

[51] Int. Cl.⁶ .......................................... G09G 5/00
[52] U.S. Cl. ........................... 345/8; 345/7; 345/10.2
[58] Field of Search ........................ 345/8, 7, 9, 212, 345/14, 102; 348/115; 340/980; 359/630, 49

[56] References Cited

U.S. PATENT DOCUMENTS

| | | | |
|---|---|---|---|
| 4,167,113 | 9/1979 | Mann | 345/9 |
| 4,830,464 | 5/1989 | Cheysson et al. | 345/8 |
| 4,997,263 | 5/1991 | Cohen et al. | 345/8 |
| 5,191,321 | 3/1993 | Herold et al. | 345/212 |
| 5,198,663 | 3/1993 | Ichikawa et al. | |
| 5,241,281 | 8/1993 | Wilkes et al. | 345/14 |
| 5,309,169 | 5/1994 | Lippert | 345/8 |
| 5,334,991 | 8/1994 | Wells et al. | 345/8 |

Primary Examiner—Richard Hjerpe
Assistant Examiner—Regina Liang
Attorney, Agent, or Firm—Ronald P. Kananen

[57] ABSTRACT

An automatic image regulating arrangement for a head-mounted image display device includes a sensor for detected conditions, such as outside ambient light, or vibration, applied to display elements of the display device and a regulating portion to control display of the images so as to compensate for conditions detected by the sensor so as to maintain good image visibility in various viewing environments.

15 Claims, 9 Drawing Sheets

AUTOMATIC IMAGE REGULATING ARRANGEMENT FOR HEAD-MOUNTED IMAGE DISPLAY APPARATUS

BACKGROUND OF THE INVENTION

1. Field of The Invention

The present invention relates generally to personal image display apparatus which permit monitoring of an image, such as a video or television image, in an immediate form via a pair of ocular lenses. Particularly, the present invention relate to an automatic image regulating arrangment for such a personal viewing apparatus so as to provide optimal visibility under different ambient light conditions.

2. Description of The Related Art

Recently, head mounted personal viewers utilizing a display element such as an LCD (liquid crystal display) provided with a backlighting arrangement and a reflective element such as a mirror to reflect the displayed image to the eyes of a viewer, have been disclosed. By utilizing for example, a convex lens for viewing and providing a concave mirror, a large image area can be provided from a relatively small display element, thus allowing the apparatus to be more effective, as well as more compact.

In such head mounted image display devices, it is necessary to reduce or interrupt intrusion of surrounding ambient light for maximizing image visibility within the goggles, helmet etc., especially if used outdoors or the like. Commonly, in outdoor use, when surrounding ambient light is too bright, the displayed image becomes difficult to see, this may become a potential danger when the image display is viewed in conjunction with another activity.

Thus it has been required to provide a personal view arrangment in which the safety of use in conditions such as described above is enhanced, while the visibility of the displayed image is maximized for allowing the viewer to sufficiently concentrate on the program (viewing) material.

Figure 10A:
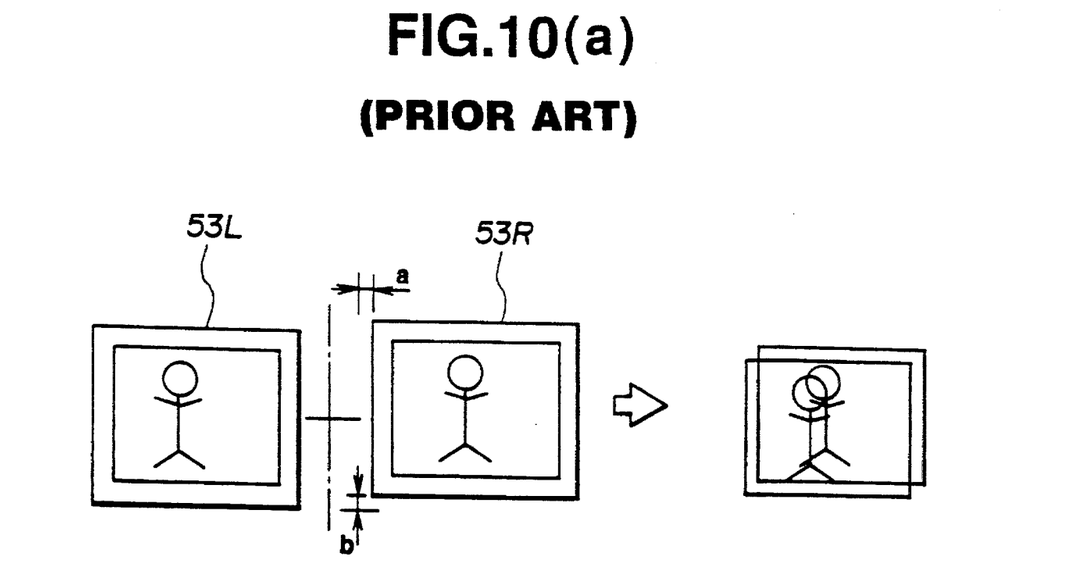
Figure 10B:
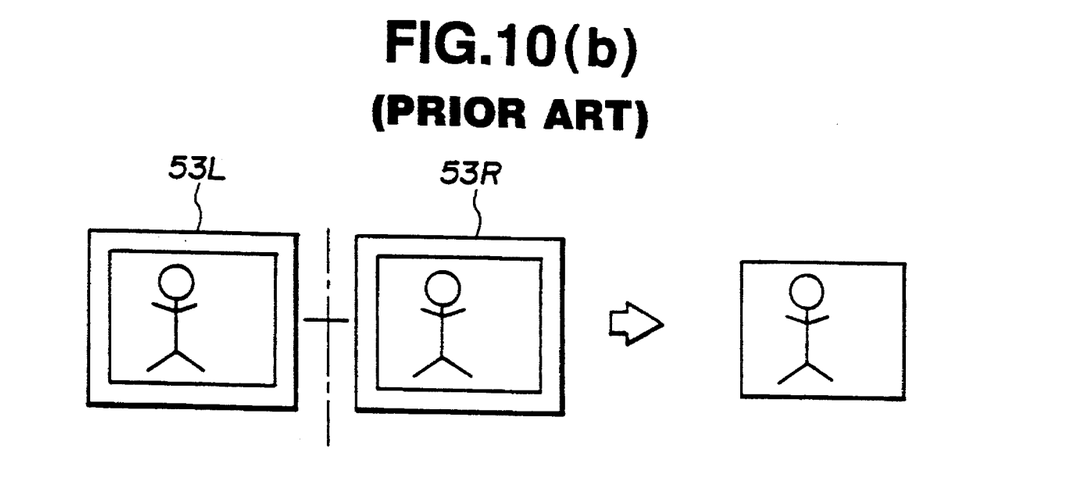

'Virtual reality' related devices have been developed by various manufacturers. Numerous types of personal viewing arrangements, including head-mounted image display devices have been disclosed which allow private viewing of program material, such as games, movies, simulations etc. Usually such a personal viewing apparatus is enclosed in a helmet or goggle type arrangement. Some disclose a head mounted image display arrangement in which a pair of LCD display panels are disposed at right and left sides of the headset (helmet, etc.) for providing images to the right and left eyes of the user. Referring now to FIGS. 10(a) and 10(b), an image adjustment method of such a conventional personal viewing device will be explained in detail.

As may be seen, an identical image is displayed on a left LCD 53L and a right LCD 53R, the alignment between the images is offset by a horizontal amount 'a' and by a vertical amount 'b'. According to the conventional method, means are provided to move the positioning of at least one on the left or right LCDs in horizontal and vertical directions for converging the images on the left and right LCDs to form a single image, as shown in FIG. 10(b). According to this construction, in order to protect image quality from impingement from outside light, it is necessary to make the LCDs quite large and or provide complete shading for the eye in order to completely block leakage of outside light in the the viewpath. However, such measures lead to a large and more costly device. Also, in a situation where it is desirable that a certain amount of outside ambient light be perceivable, the above situation is not advantageous since it attempts to prevent any penetration of ambient light.

Also, since such a personal viewer is likely to be used in various locations or environments, each having potentially different ambient light levels, being in sunlight, incandescent light, fluorescent light etc. According to these differing ambient light sources, a white balance of images displayed in such different environments may be effected making it difficult to consistently display a correct colour balance for providing realistic colour to the display material.

Another problem which may be encountered in such personal display devices can be misplacement of one or more of the LCDs during manufacture, in such a case it may be impossible to adjust the displayed image to enable suitable viewing by the user.

Thus it has been required to provide a image regulating arrangement for a personal image display device which will solve the above problems while allowing the device to remain compact. Also the present invention provides for individual adjustment of both displays so as to provide suitable image adjustment for all users.

SUMMARY OF THE INVENTION

It is therefore a principal object of the present invention to overcome the drawbacks of the related art.

It is a further object of the present invention to provide an automatic image regulating arrangement for head-mounted image display devices which is compact.

It is a further object of the invention to provide individual adjustment of left and right eye displays so as to provide suitable image adjustment for all users.

In order to accomplish the aforementioned and other objects, an automatic image regulating arrangement for a head-mounted image display device is provided, comprising:

BRIEF DESCRIPTION OF THE DRAWINGS

In the drawings:

FIGS. 10 (a) and (b) are explanatory diagrams for explaining a conventional image display image regulating arrangement.

DESCRIPTION OF THE PREFERRED EMBODIMENT

Referring now to the drawings, a first preferred embodiment of the invention will be described hereinbelow in detail.

Figure 1:
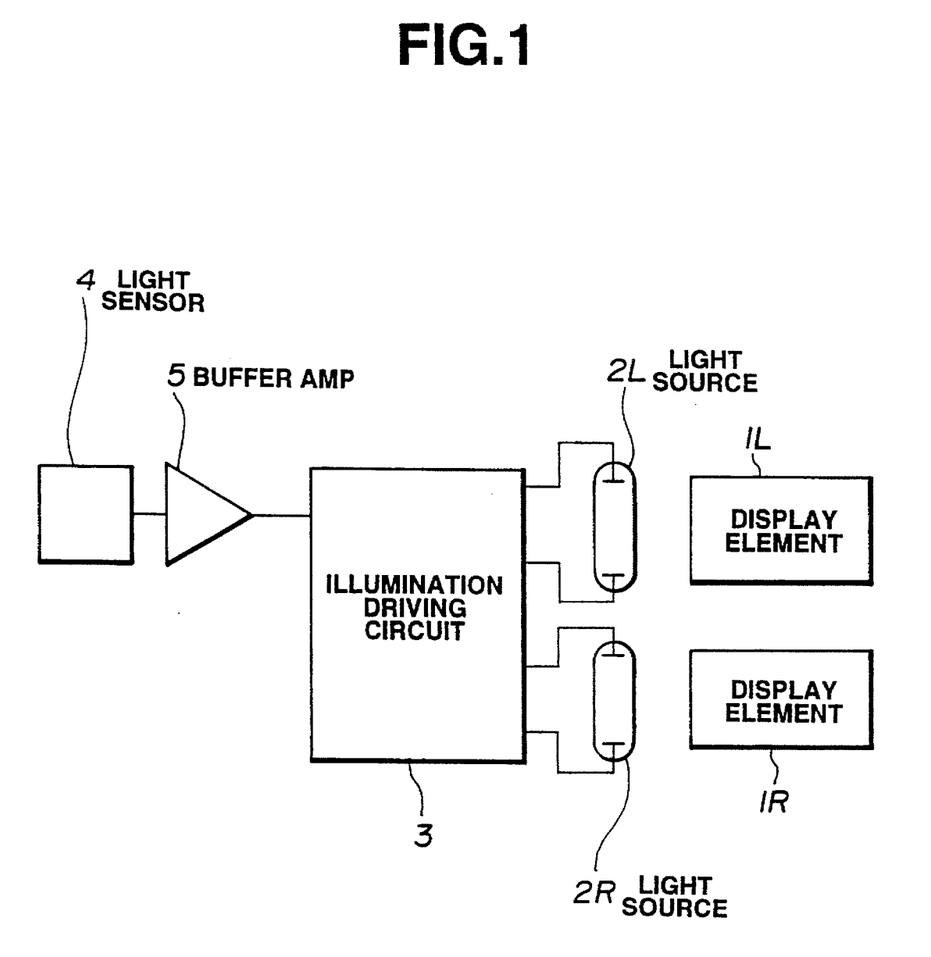
FIG. 1 is a block diagram of a first preferred embodiment of an automatic image regulating arrangement according to the invention.

FIG. 1 shows a block diagram of the arrangement of the first embodiment. As may be seen, the device includes a light sensor 4 which is connected to an illumination driving circuit 3 via a buffer amp 5. The illumination driving circuit drives light sources 2L and 2R according to the input of the light sensor. The light sources 2L and 2R are effective for illuminating the display means, which may be for example, liquid crystal display elements 1L and 1R.

Figure 2:
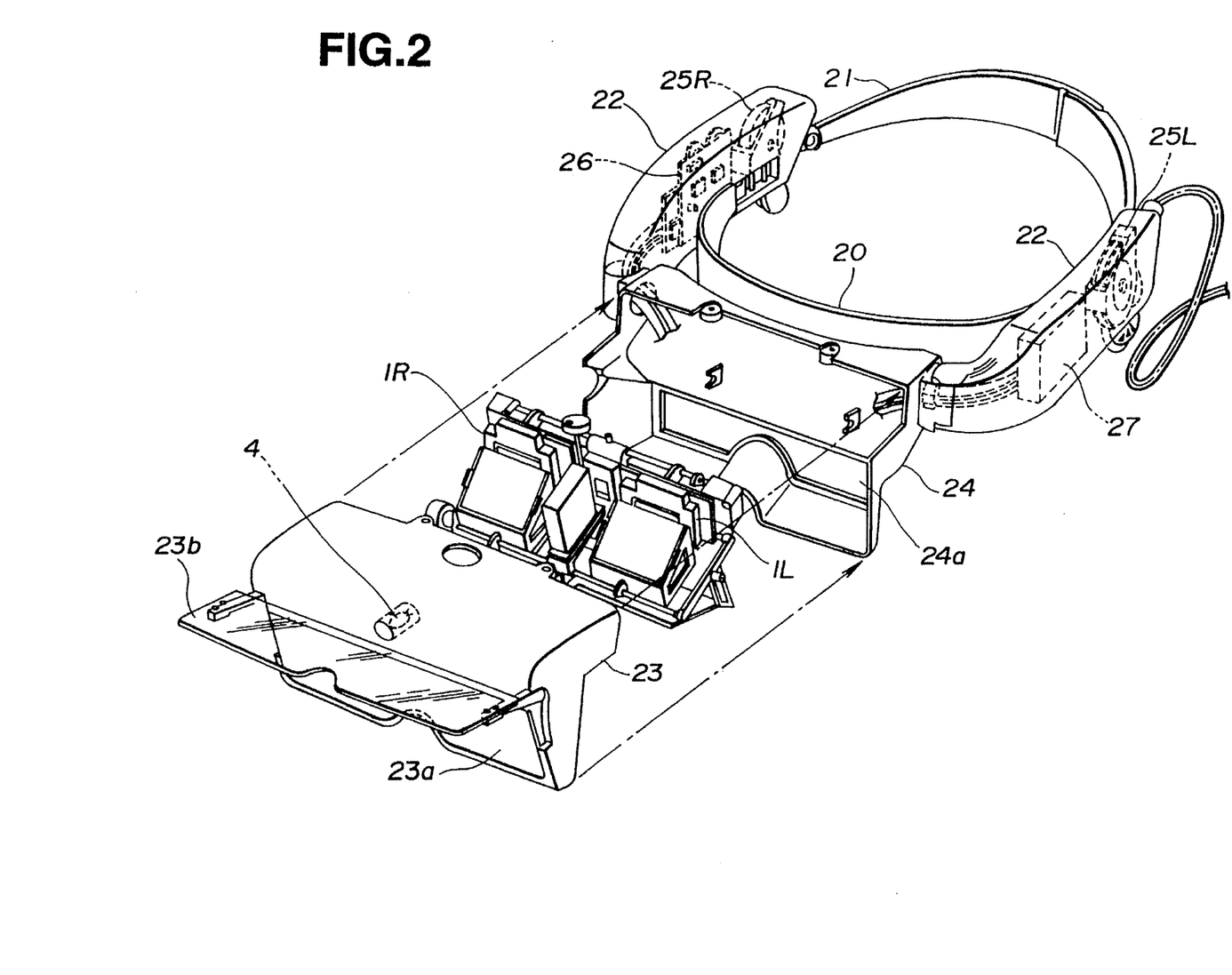
FIG. 2 shows an exploded perspective view of a head-mounted image display apparatus incorporating the invention.
Figure 3:
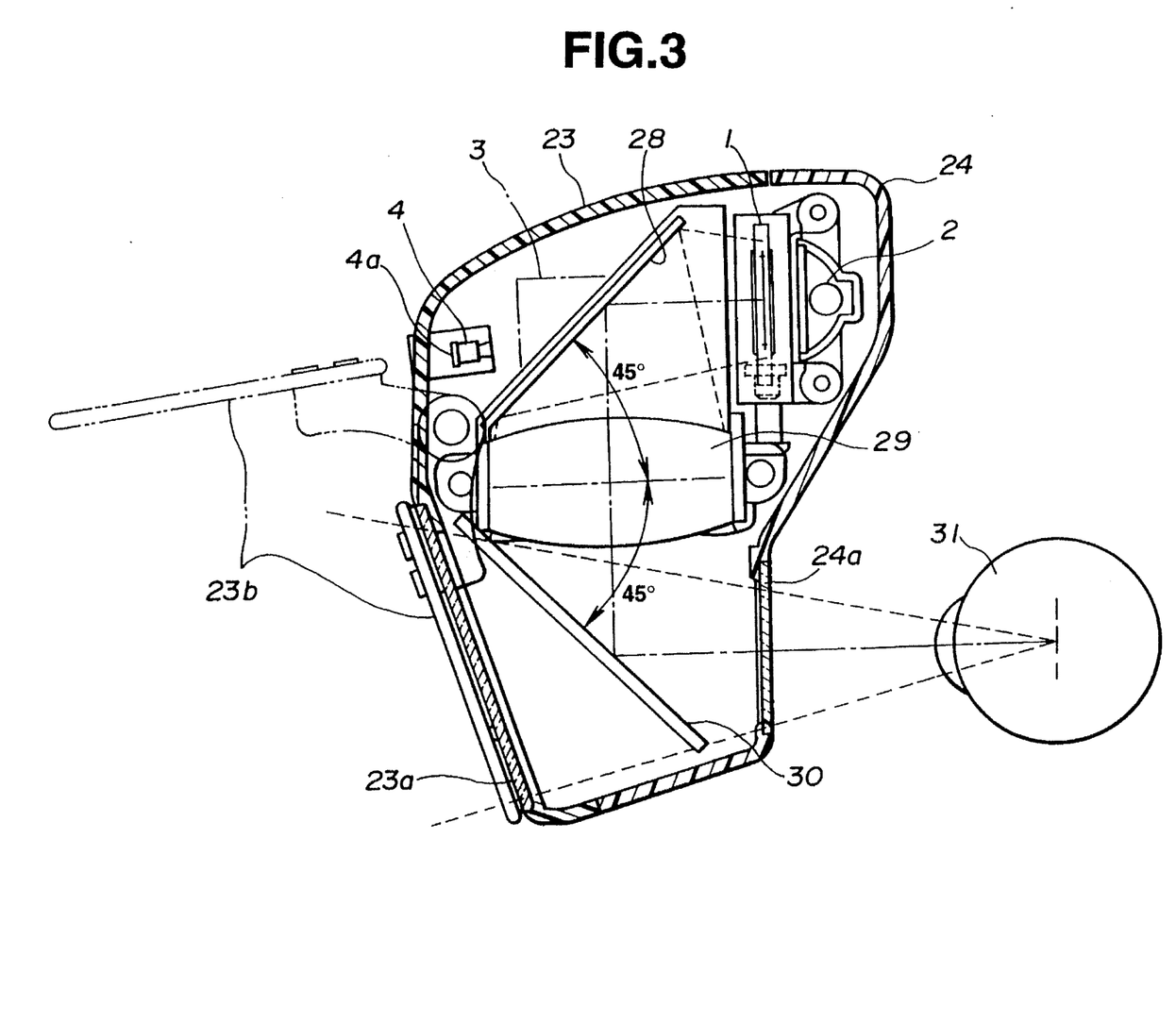
FIG. 3 is a cross-sectional view showing the optical characteristics of an image display apparatus incorporating a image regulating arrangement.

Referring now to FIGS. 2 and 3, the arrangement according to the invention Further includes a forehead pad 20, a head ring 21 for retaining the device on a users head, side wall portions 22, 22 for acting as bows of the head-mounted viewing apparatus as well as mounting components therewithin, a front cabinet 23 and a rear cabinet 24 between which the image display elements (LCDs) etc., are disposed.

The front cabinet 23 includes a front window portion 23a and a tinted, or smoked, visor portion 23b for reducing an amount of ambient light admitted to the cabinet. Further, the above-mentioned left and right image display elements, being liquid crystal display panels according to the present embodiment, as well as the left and right light sources 2L and 2R are mounted at left and right sides respectively between the front and rear cabinets 23 and 24. In addition, within the side wall portions 22, 22, left and right headphone units, and a system substrate 26, which may include an image signal process circuit, a display driving circuit, a cycle dividing circuit and a timing generator circuit, as well as a power source 27 are mounted.

The light sensor 4 may, for example, be interposed between the interior of the cabinets 23, 24 and a white colored semi-trasparent plate 4a, as shown in FIG. 3.

As also seen in FIG. 3, the light sources 2L, 2R are mounted in an upper rear side of the rear cabinet 24, behind the LCDs 1L, 1R and in line with an upper mirror 28 which is mounted at an angle in the upper side of the front cabinet 23. Horizontally mounted at a middle portion of the front cabinet 23 is a focussing lens 29, below which is mounted a half-mirror 30 which is also mounted at an angle. According to the present embodiment, the mirror 28 and the half-mirror 29 are mounted at 45° relative to the horizontally mounted lens 29. Also, the lower half-mirror allows light from the outside to enter through the window 23a to enter the eyes 31, 31 of the user.

It will be noted that the buffer amp 5 of FIG. 1 may be integrally formed with the light sensor 4 or alternatively, the buffer amp 5 may be formed with the illumination driving circuit.

Hereinbelow, operation of the above-described first embodiment will be described in detail.

The light sensor 4 is disposed in the viewing direction of a user wearing the image display arrangement. The light sensor 4 may be mounted at an interior portion of the front cabinet 23 so as to detected an outside ambient light level as perceivable by the user. The sensor output, for example voltage fluctuation, is input to the buffer amp 5 and the output of the buffer amp 5 is input to the illumination driving circuit 3. According to this construction, when bright ambient light is detected by the light sensor 4, the illumination driving circuit 3 controls the light sources 2L, 2R (i.e. fluorescent tube backlights) to a correspondingly higher (brighter) output. Conversely, when low ambient light conditions are detected by the light sensor 4, the output of the light sources 2L, 2R are correspondingly reduced, thus allowing the user always to vividly see the displayed image. Because the visibility of the image is not dependent on the brightness of the outside ambient light, it is not necessary, according to the present embodiment to include an ambient light interrupt circuit, or the like and thus the size of the unit may be reduced and a degree of design freedom increased. Also, since ambient outside light is admitted to the arrangement according to the invention, the user may view the displayed image while it is still possible to visually monitor the surroundings. It will further be noted that the image regulating arrangement according to the invention may be used for display of color or black and white images.

Figure 4:
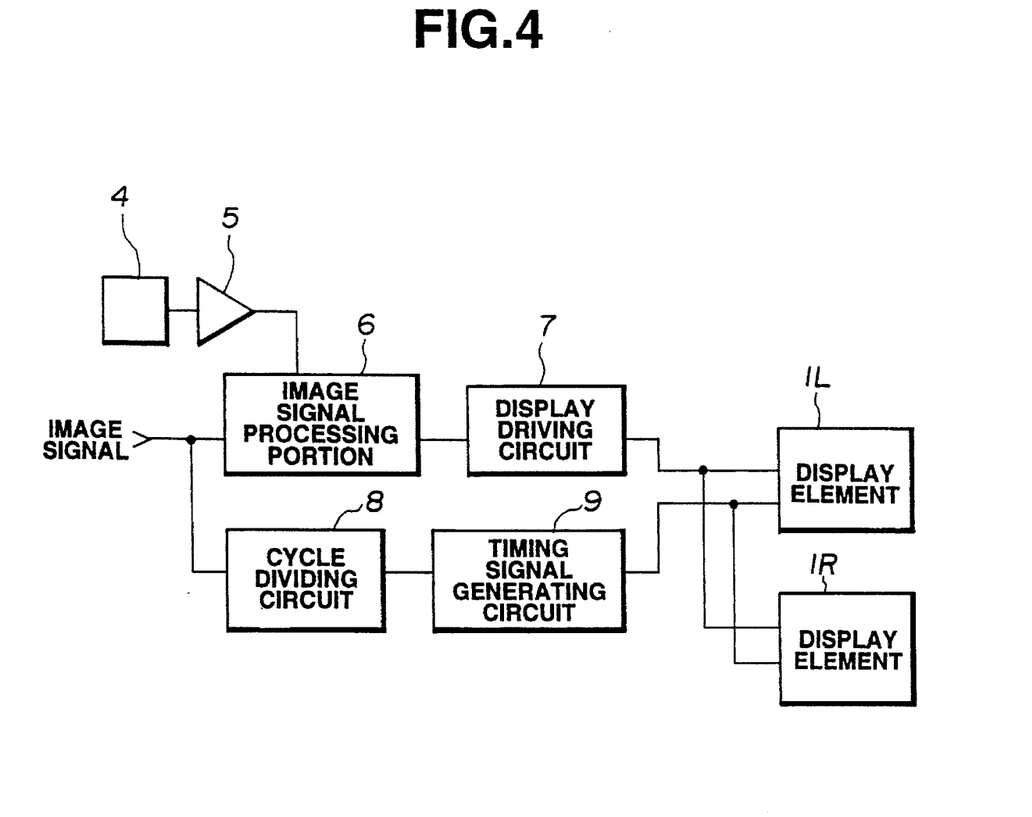
FIG. 4 is a block circuit diagram of a second preferred embodiment.

Next, a second embodiment of a image regulating arrangement for a head mounted display device according to the invention will be explained in detail with reference to FIG. 4.

According to the second embodiment, a light sensor 4 and buffer amp 5 are arranged substantially as set forth in the above-described first embodiment. The construction of the present embodiment further includes an image signal processing portion 6 and a cycle dividing circuit 8, both of which receive an input video signal. The image signal processing portion 6 is connected to a display driving circuit 7 which outputs image data to left and right LCDs 1L and 1R. The cycle dividing circuit is connected to a timining signal generating circuit for outputting timing signals to the left and right LCDs 1L and 1R for controlling the timing of image display.

In operation, the light sensor 4 detects a degree of outside ambient light and the output thereof is amplifed by the buffer amp 5. The output of the buffer amp 5 is input to the image signal processing portion 6. At this, in response to the voltage input from the buffer amp 5, the amplitude, clamp level, non-linear gain (γ correction) of the image signal is suitably adjusted. Then, at the display driving circuit, the light penetration level for each of the image elements (LCDs, for example) are controlled along with brightness and contrast for each image element respectively. According to this control of the light penetration level, as this is amplified the image viewed by the user will brighten in response to bright outside ambient light, conversely, if a low level of ambient light is present, the image will darken accordingly.

In other respects the present embodiment is the same as the above-described first embodiment. However, according to the first embodiment, the output of the backlighting, light sources 2L and 2R is controlled for adjusting the visibility of the image display LCDs 1L, 1R while, according the present embodiment, the light penetration level of the image signal is varied directly to produce the same effect. According to the second embodiment, the image regulating arrangement according to the invention may be used to control cathode ray tubes and/or other types of display elements in addition to liquid crystal display elements. Like the first embodiment, the present embodiment is effective for display of color or monochrome program material. It will be noted that according to the above embodiment, the reflectivity of the half-mirror 80, for example, may be modified to alter the viewing characteristics of the arrangement.

Figure 5:
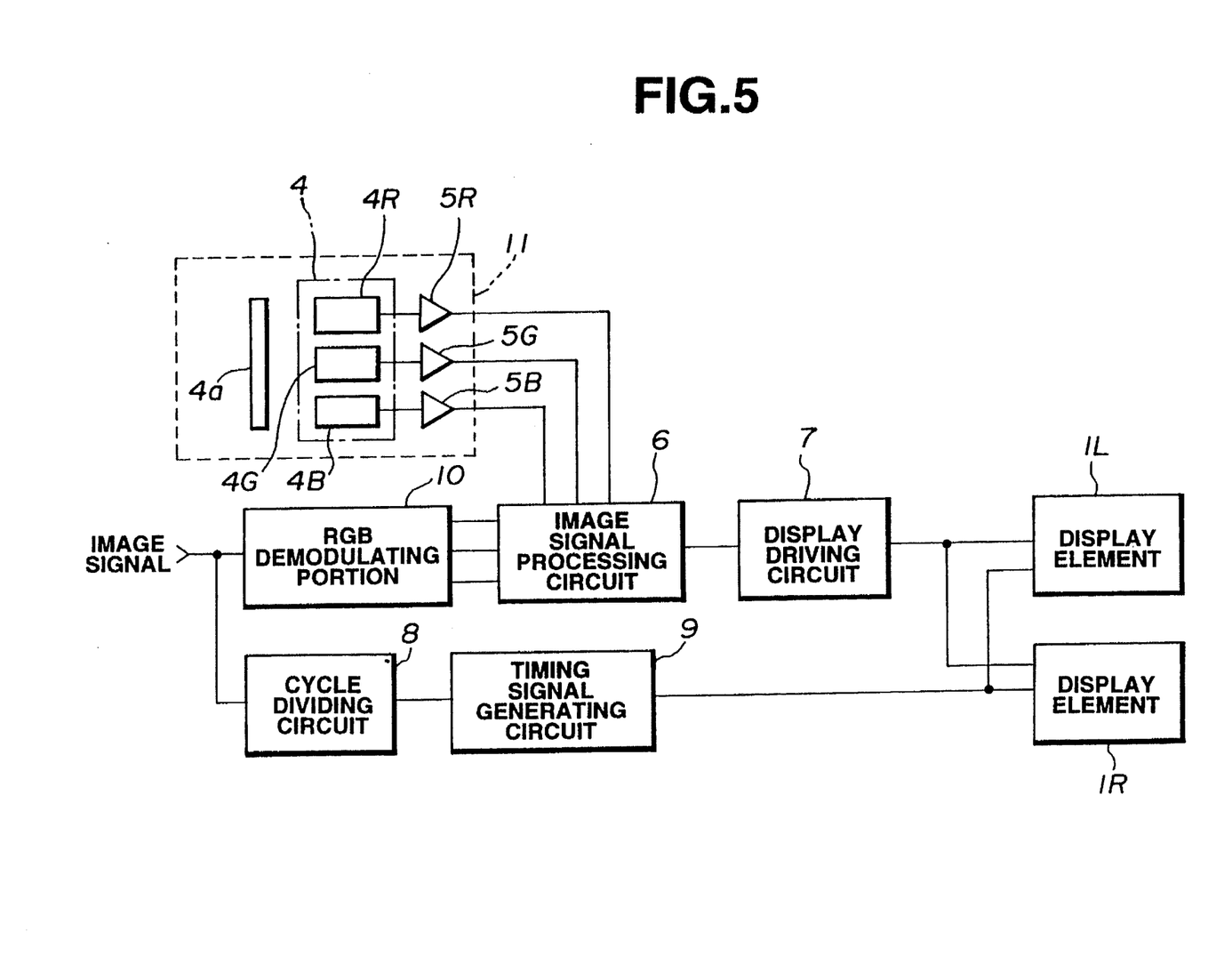
FIG. 5 shows a block circuit diagram of a third preferred embodiment of the invention.

Referring now to FIG. 5, a third embodiment of a image regulating arrangement for a head-mounted image display device will be described hereinbelow.

The third embodiment is applicable for color image data such as a color video signal. Referring to the drawing, the arrangement of the present embodiment includes image display elements 1L, 1R which are mounted so as to provide image display to the left and right eyes of a user. Similarly to the second embodiment, an image signal processing portion 6 and a display driving circuit 7 are connected to provide the image data to the display elements 1L, 1R. The present embodiment further includes a cycle dividing circuit 8 connected to a timing signal generating circuit for controlling display timing as explained hereinabove in connection with the second embodiment. However, according to the present embodiment, the image processing portion 6 receives the input composite color image signal via an RGB demodulating portion 10 which outputs R (red), G (green), B (blue) image signals. Further, the image processing portion 6 receives input from a sensor assembly 11 including color sensitive sensing portion comprising a red sensor 4R, a green sensor 4G and a blue sensor 4B which output signals representative of the respective color values detected to the image processing portion 6 via buffer amps 5R, 5G, 5B. Further, in front of each of the sensors 4R, 4G, 4B, a white balance plate 4a is provided as with the above-described First embodiment.

In operation the color sensors 4R, 4G, 4B detects a color balance and intensity of outside ambient light via the white balance plate 4a and the output of the respective color sensors 4R, 4G, 4B is amplifed by the buffer amps 5R, 5G, 5B. The output of the buffer amps 5R, 5G, 5B are input to the image signal processing portion 6 which also receives an image signal, such a a composite color signal, or the like. At this, in response to the voltage input from the buffer amps 5R, 5G, 5B, the amplitude, clamp level, non-linear gain (γ correction) of the output RGB image signal is suitably adjusted and input to the display driving circuit which passes the adjusted RGB signal to the image display elements 1L, 1R (color LCDs, for example). According to this the image viewed by the user will brighten in response to bright outside ambient light, conversely, if a low level of ambient light is present, the image will darken accordingly.

According to the above structure, a user of a head-mounted image display device provided with the image regulating arrangement including white balanced color sensors according to the invention is enabled to see a more natural color balance. Further the composite color signal may be processed according to operation of the color sensor assembly, before or after being divided into respective Red, Green and Blue signals. The white balance sensing carried out according to the present embodiment may also be utilized to carry out automatic adjustment of contrast, brightness, etc., as set forth in the previous embodiment.

Figure 6:
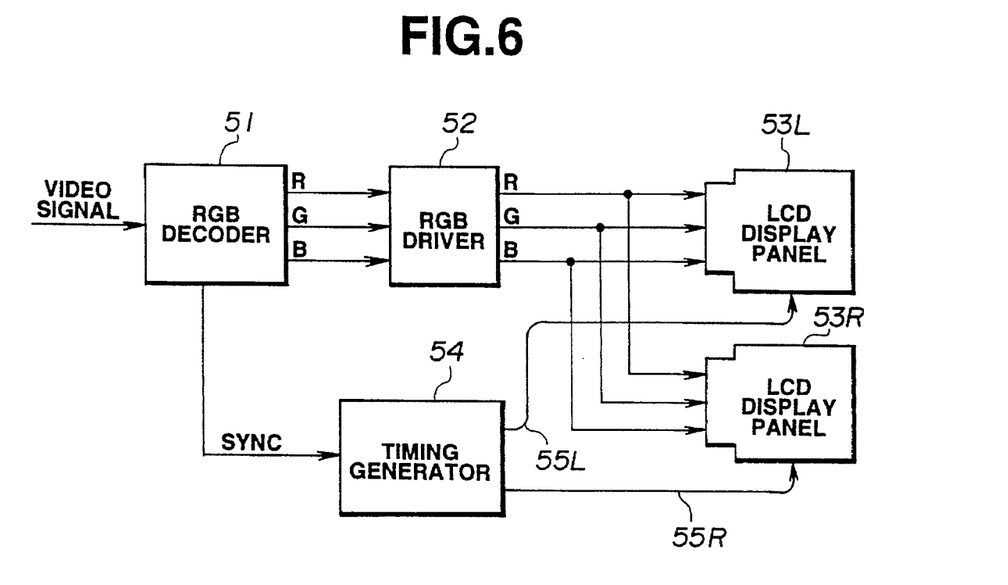
FIG. 6 is a block circuit diagram of a fourth embodiment according to the invention.
Figure 7:
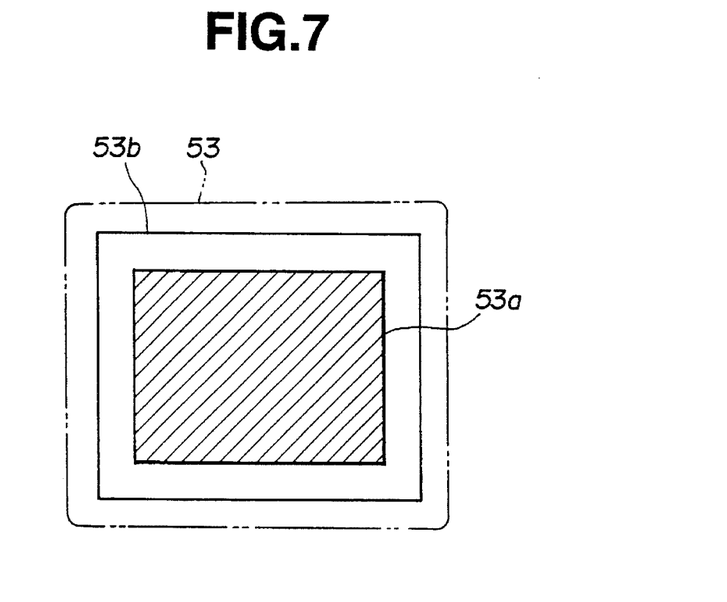
FIG. 7 shows a liquid crystal display panel utilized in the apparatus of the invention.

Referring now to FIGS. 6 and 7, a fourth embodiment of a image regulating arrangement according to the invention will be described hereinbelow in detail.

According to the fourth embodiment, a image regulating arrangement for a head-mounted image display device according to the invention comprises an RGB decoder 51 receiving a input video, or image data signal, such as a composite color signal. The RGB decoder 51 outputs respective color signals R (red), G (green) and B (blue) to an RGB driver circuit 52 and concurrently a synchronization signal SYNC is extracted and output to a timing generator 54. The RGB driver circuit 52 outputs the R, G and B signals to each of the display elements 53L, 53R respectively. The timing generator 54 outputs display control signals 55L, 55R to the display elements 53L, 53R for controlling an image display.

According to the present embodiment, the display elements are LCD (liquid crystal display) panels having a structure as shown in FIG. 7. As may be seen in the drawing, the LCD 53 includes a central image area 53a surrounded by a larger imaging surface 53b.

In addition, control via the display control signals 55L, 55R, may be effected such that the central image area 53a may be moved up, down, right and left within the bounds of the larger imaging surface 53b.

The timing generator 54 may act as an image timing variation means by controlling CR (capacitance and resistance values) from a fixed time value delay circuit or the like. Variation of the resistance value, volume of the like, may be used as a method of causing the image timing to be delayed or advanced or, utilizing an oscillation signal divider circuit interchange may also be used for advancing or delaying image timing. According to this, the timing signal may be generated as a frequency division of the oscillation signal cycle.

Also, it is possible to effect the abovedescribed structure by generating the display control signals 55L, 55R via a microcomputer or the like. At this, a timing adjustment value written at the microcomputer may be produced based on a fixed timing value stored in a computer memory or the like. Variation of the values set in memory allows variation of the timing value to be obtained. Further, suitable adjustment of the above may be effected in the factory before shipping.

Hereinbelow operation of the arrangement according to the present embodiment will be explained in detail.

Figure 8A:
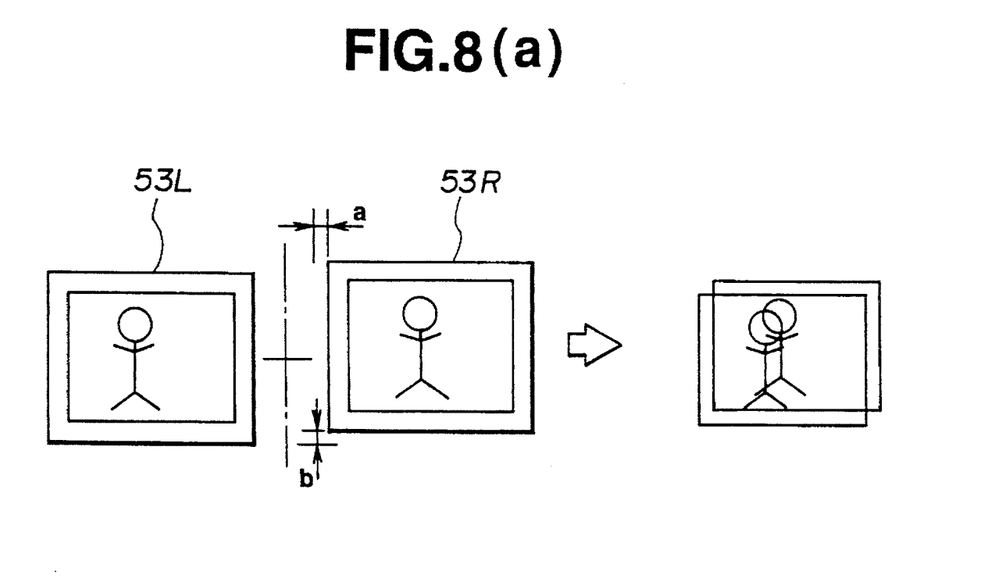
FIGS. 8(a) and (b) are explanatory diagrams of the operation of the above-mention third embodiment.
Figure 8B:
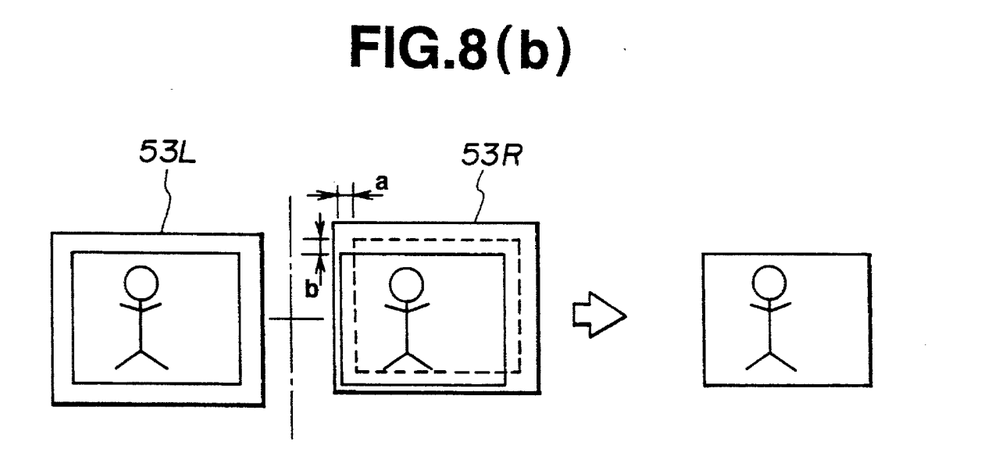

Referring to FIGS. 6 and 8(a), (b), the input video signal passes through the RGB decoder 51 and the RGB driver 52 to be converted into RGB image signals to be input to the LCD panels 53L, 53R. The RGB signals are supplied to the LCD panels 53 based on the display control signals 55L, 55R generated at the timing generator 54.

According to this, when the right and left eyes respectively view images on the left and right LCD panels 53L, 53R, and convergence of images displayed thereon, as in FIG. 10(b), is desired, the central image, using, for example, the left image display as a standard, the central imaging area 53a of the right LCD panel 53R may be moved by a distance 'a' on the X (vertical) axis of the larger image area 53b and by a distance 'b' on the Y (horizontal) axis of the larger image area 53b according to variation of the display control signal 55R generated at the timing generator. In addition, according to the structure of the invention, the imaging areas on either, or both of the LCD panels 53 may be moved freely in vertical and horizontal direction, or may be enlarged to provide a larger central imaging area according to variations in the display control signals. Unlike the system of the prior art, means by which one or both of the display panels can be physically moved in order to effect image convergence is not required.

However, an inherent problem of such head-mounted image display devices is that, if worn in a vehicle or aircraft, for example, vibrations may cause image fluctuations on one or both of the LCD panels making the displayed images very difficult to see.

Figure 9:
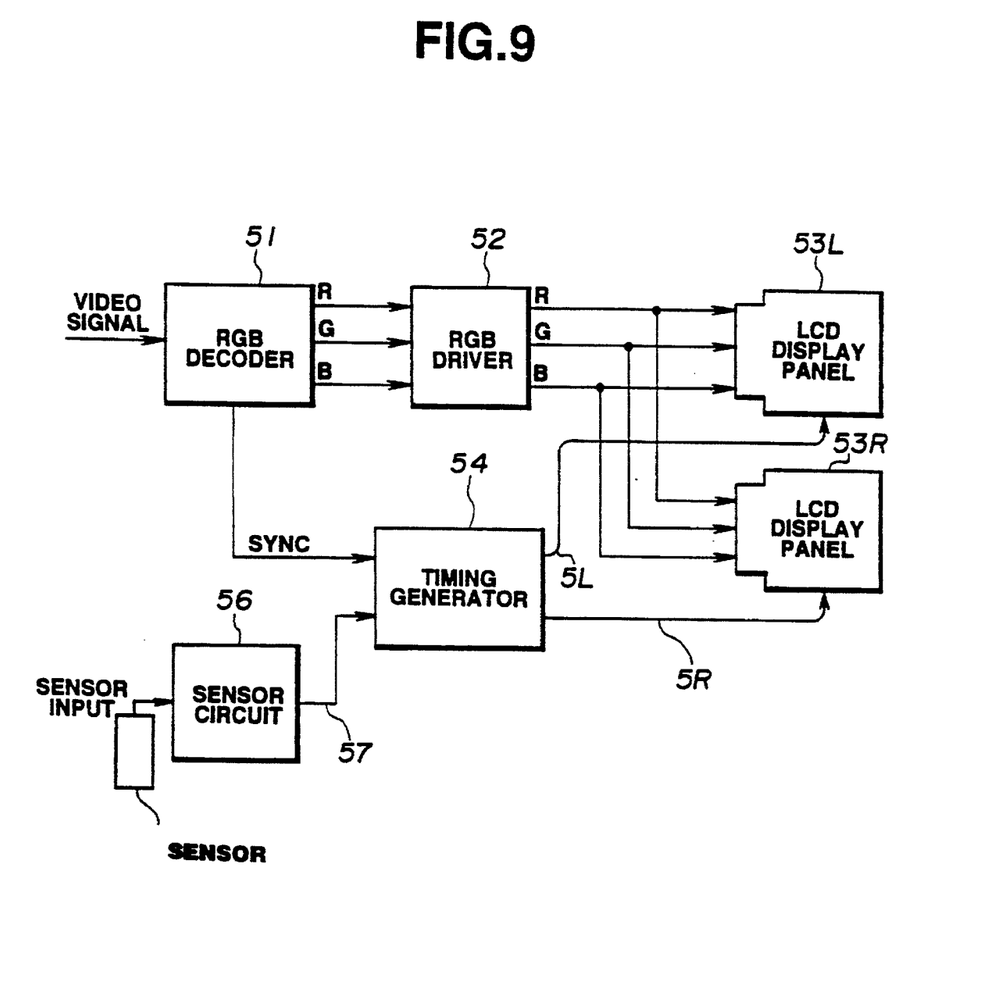
FIG. 9 is a block diagram of a possible application of the arrangement of the invention.

At this, FIG. 9 shows an example of one application of the above-described fourth embodiment which may be utilized to resist fluctuation of a displayed image. As may be seen, the arrangement according to this application includes a sensor circuit 6 connected to the timing generator 54. The sensor circuit receives input from an angular velocity sensor or the like. According to this structure, the sensor circuit is active to output a signal which is the inversion of angular velocity detected by the angular velocity sensor to the timing generator for modifying the output display control signals 55L, 55R so as to counteract the effects of vibration, etc.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An automatic image regulating arrangement for an enclosed image display device, comprising:

a light opaque casing;

a display portion disposed in said casing and receivable of a video signal, said display portion including means for producing an image and a selectively energizable backlighting source which exclusively illuminates the image;

a first reflective member disposed in said casing for reflecting the image produced by said display portion in a first direction;

a single second semi-reflective member disposed statically in said casing for reflecting said image in a second direction different from said first direction, said second semi-reflective member exclusively permitting ambient light to be transmitted therethrough in said second direction into said casing;

sensor means for detecting a condition affecting visibility of said image displayed on said display portion and outputting a signal indicative thereof; and regulating means for receiving said sensor output and including means for varying visibility of an image displayed at said display portion in response to said sensor signal, and for compensating for the visibility reducing effect of excess ambient light which is transmitted through said second semi-reflective member in said second direction.

2. An automatic image regulating arrangement as set forth in claim 1, wherein said detected condition is an ambient light level outside said enclosed image display device.

3. An automatic image regulating arrangement as set forth in claim 2, wherein said means for varying visibility is a light source disposed so as to illuminate said display portion, said regulating means varying an output of said light source in response to said sensor signal.

4. An automatic image regulating arrangement as set forth in claim 3, wherein when a higher level of ambient light is detected by said sensor means, said regulating means increases an output of said light source and, when a lower level of ambient light is detected by said sensor means, said regulating means reduces said output of said light source.

5. An automatic image regulating arrangement as set forth in claim 1, wherein said means for varying visibility comprises means for varying a tranmissivity of a display element of said display portion, said regulating means varying said transmissivity in response to said sensor signal.

6. An automatic image regulating arrangement as set forth in claim 5, wherein when a higher level of ambient light is detected by said sensor means, said regulating means increases transmissivity of said display element and, when a lower level of ambient light is detected by said sensor means, said regulating means reduces said transmissivity of said display element.

7. An automatic image regulating arrangement as set forth in claim 1, wherein a tinted semi-transparent cover is disposed between said second semi-reflective member and an outer side of said image display device, said tinted semi-transparent cover being movable at least between open and closed positions adjusting an amount of ambient light admitted by said semi-reflective member.

8. An automatic image regulating arrangement as set forth in claim 1, wherein said display portion is capable of producing color images and wherein said sensor means detects a level of each of a plurality of colors contained in said ambient light, said means for varying visibility being active to vary an intensity of a particular color in said displayed image in response to said signal output by said sensor means.

9. An automatic image regulating arrangement as set forth in claim 1, wherein said sensor means is responsive to vibration and wherein said display portion includes a display element having an imaging area of a predetermined size, said imaging area being established on an image surface of said display element having a predetermined size greater than said imaging area, and wherein said visibility varying means is active to vary a position of said imaging area on said image surface in response to said signal output by said sensor means.

10. An automatic image regulating arrangement as set forth in claim 9, wherein said visibility varying means is further active to vary a timing signal of said image display device by generating the timing signal based on a frequency division of a main oscillation signal.

11. An automatic image regulating arrangement as set forth in claim 10, wherein said visibility varying means includes a microcomputer including memory data representative of image display timing values, said visibility varying means generating said timing signal based on said memory data.

12. An automatic image regulating arrangement as set forth in claim 11, wherein said sensing means outputs a signal proportional to the inverse of said detected vibration, said visibility varying means active to vary a location of said imaging area on said image surface of said display element in response to said signal.

13. An automatic image regulating arrangement for an enclosed image display device, comprising:

a light opaque casing adapted to be worn on the head of a viewer in a manner which encloses the viewer's left and right eyes;

a display means disposed in said casing, said display means being adapted to receive a video signal and including a pair of image display elements which produce display images for the respective left and right eyes of the viewer, said display means including a selectively energizable backlighting source which illuminates the images produced by said pair of image display elements;

a first reflective member disposed in said casing for reflecting the images produced by said pair of display elements in a first direction;

a single static second semi-reflective member disposed in said casing for reflecting the images reflected by said first reflective member in a second direction different from said first direction, said second semi-reflective member permitting ambient light to be transmitted therethrough in said second direction into said casing;

sensor means for detecting a condition which varies with at least one of an ambient light level and a vibration which is applied to said pair of image display elements, and which deteriorates visibility of the images produced by said pair of display elements, and for outputting a signal indicative thereof; and regulating means responsive to the signal output by said sensor and including means for varying a characteristic of the images produced by said pair of image display elements in a manner which compensates for the image deteriorating effect of the condition which is detected by said sensor means.

14. An automatic image regulating arrangement as set forth in claim 13, wherein said backlighting source exclusively illuminates the images produced by said pair of display elements.

15. An automatic image regulating arrangement as set forth in claim 13, wherein said second semi-reflective member exclusively permits ambient light to enter into said casing.

* * * * *